(No Model.)
C. SPRAKE.
FORK.
No. 416,651. Patented Dec. 3, 1889.
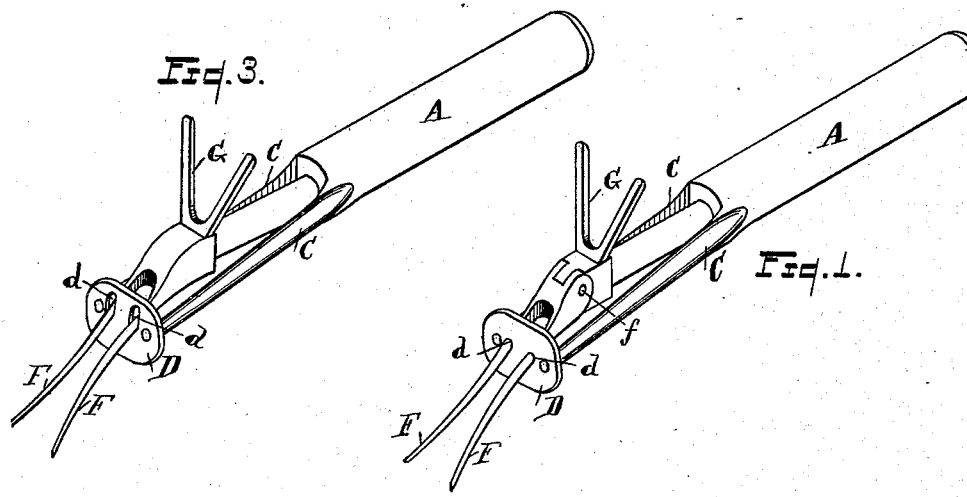
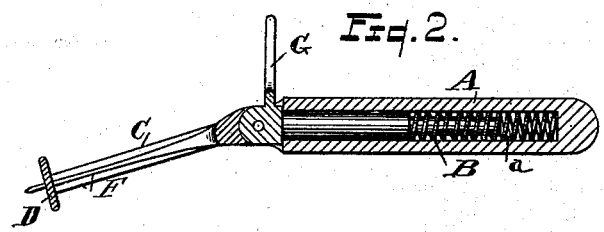
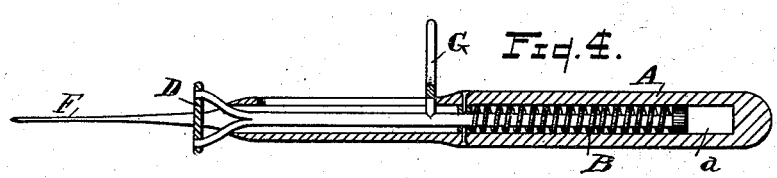
WITNESSES
W. S. Huyette
L. A. Doelty
INVENTOR
Charles Sprake
By Wells W. Leggett & Co.
Attorneys.

UNITED STATES PATENT OFFICE.

CHARLES SPRAKE, OF DETROIT, MICHIGAN.

FORK.

SPECIFICATION forming part of Letters Patent No. 416,651, dated December 3, 1889.

Application filed March 22, 1889. Serial No. 304,259. (No model.)

*To all whom it may concern:*

Be it known that I, CHARLES SPRAKE, a citizen of the United States, residing at Detroit, county of Wayne, State of Michigan, have invented a certain new and useful Improvement in Forks; and I declare the following to be a full, clear, and exact description of the invention, such as will enable others skilled in the art to which it pertains to make and use the same, reference being had to the accompanying drawings, which form a part of this specification.

In the drawings, Figure 1 is a perspective view of my improved fork, and Fig. 2 is a longitudinal section of the same with the tines contracted and the springs compressed. Figs. 3 and 4 are variations.

In carrying out my invention A represents the handle of my fork, which is bored to receive the spring B. Extending from the open end of this handle are two arms C, which are joined at the end by the guard or cross-piece D, having the openings $d$.

F are the tines of the fork, and are joined to the shank by the pivot $f$. The shank enters the bore $a$ of the handle and presses against the spring B. The tines of the fork are passed through the openings $d$, and are always kept in an extended position by the spring, except when retracted by external force.

G is a projection from the fork, which serves the double purpose of a rest for the fork and a suitable place to rest the forefinger when using the fork.

The operation of the work will be at once seen. When in use as a carving-fork, it may be grasped by the handle A, with the forefinger resting on the projection G. When a piece of meat or other article is picked up and transferred to the desired place, the operator may, by the pressure of his forefinger, retract the tines, and the guard or cross-piece will force the article off the tines. By releasing the pressure of the finger the spring will return the tines to their normal position. Thus the difficulty of clearing the fork which is now experienced is obviated, the operation being accomplished in a simple and effective manner with the use of only that hand that grasps the fork.

Of course I do not limit myself to any particular number of tines of the fork, nor do I limit myself to the exact construction shown, since that shown in Fig. 3 would also accomplish the same object and would be contemplated by me. In this latter construction the tines and the shank are made integral, and the orifices $d$ in the guard are elongated to give the tines the necessary play; nor do I limit myself to a construction wherein the guard remains stationary and the tines move therein, since a construction wherein the tines were stationary and the guard made movable would accomplish the same result and would of course be contemplated by me. This latter construction is shown in Fig. 4, wherein A represents the handles; F, the tines; D, the guard or cross-piece, and G the projection on which the finger may rest in carving.

To clear the fork the operator pushes the guard out over the tines, and it is retracted by the spring B.

What I claim is—

1. A carving-fork with a guard located adjacent to the tines, said tines adapted to move longitudinally adjacent to said guard, substantially as described.

2. A carving-fork consisting of a handle bored longitudinally to receive the shank of the tines and a guard loosely embracing the tines, said tines adapted to move longitudinally in said guard, substantially as described.

3. In a carving-fork, the combination, with the handle, the guard, and the tines adapted to move thereon, of the projection G, whereby the tines may be retracted, and a spring for returning the tines to their normal position, substantially as described.

In testimony whereof I sign this specification in the presence of two witnesses.

CHARLES SPRAKE.

Witnesses:
W. H. CHAMBERLIN,
L. A. DOELTZ.